Aug. 21, 1951

C. J. BLASIUS 2,564,952

WINDSHIELD

Filed Aug. 12, 1947

Inventor

Charles J. Blasius

By *Clarence A. O'Brien and Harvey B. Jacobson*
Attorneys

Aug. 21, 1951     C. J. BLASIUS     2,564,952
WINDSHIELD

Filed Aug. 12, 1947     2 Sheets-Sheet 2

Inventor

Charles J. Blasius

By *Clarence A. O'Brien and Harvey B. Jacobson*
Attorneys

Patented Aug. 21, 1951

2,564,952

UNITED STATES PATENT OFFICE 2,564,952

WINDSHIELD

Charles J. Blasius, Idaho Falls, Idaho

Application August 12, 1947, Serial No. 768,204

3 Claims. (Cl. 2—11)

This invention appertains to novel and useful improvements in windshield devices adapted to be secured to a person's body while riding and operating certain vehicles such as motorcycles, bicycles and the like.

An object of this invention is to protect the face and other portions of the anatomy of an operator of a vehicle.

Another object of this invention is to provide means for carrying out the above mentioned function.

Another object of this invention is to provide a substantially semi-ellipsoidal transparent member on a support for protecting an individual from wind and the like.

A further object of this invention is to provide means for supporting said transparent member.

Another purpose of this invention is to provide means for adjustably securing said transparent member to the said support.

A still further object of this invention is to provide ancillary securing means attachable to a selected element of a bicycle or motorcycle and also secured to the transparent member.

A still further object of this invention is to provide resilient shock reducing means in said last mentioned means.

Another purpose of this invention is to provide improved means for detachably securing the support to a selected portion of an anatomy, said securing means having associated therewith means for attaching and detaching the invention relative to any selected, suitable anchoring means on a vehicle.

Another purpose of this invention is to provide an extremely simple, smoothly operative device of the character described which is practical and commercially feasible.

Ancillary objects and features of novelty will become apparent to those skilled in the art, in following the description of the preferred embodiment of the present invention, illustrated in the accompanying drawings, wherein.

Referring now to the illustrated preferred embodiment of the present invention in detail, like reference characters are used to indicate similar elements thereof.

This invention has been conceived and developed to provide a device for the purpose of shielding the face and upper portion of the anatomy of an operator of certain types of vehicles such as motorcycles, bicycles and the like. As is well known, road dirt, sand, rain, wind and other undesirable elements such as small insects and the like have been a hazard and discomforting force to those operating certain types of vehicles as outlined above. It is within the purview of this invention to provide means which is detachably secured to the body of an individual, for obviating or materially reducing the possibility of such undesirable elements striking the operator of the vehicle.

The special configuration of the transparent member (semi-ellipsoidal) has been chosen for two purposes. First, the leading edge of the member is streamline thereby materially reducing drag occasioned by forcing the windshield through the air at a relatively high speed. The second function and reason for choosing such a configuration is the factor of safety involved. It is quite obvious that an ellipsoidal or semi-ellipsoidal member is far more resistant to forces applied substantially perpendicular to the minor axis thereof than other types of geometric figured configurations.

Figure 1:
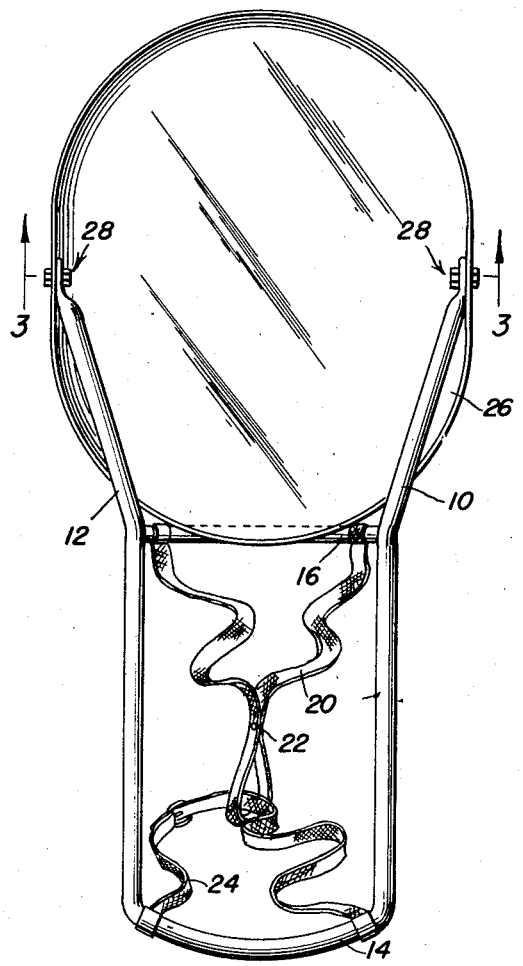
Figure 1 is an elevational front view of the first form of the invention.
Figure 2:
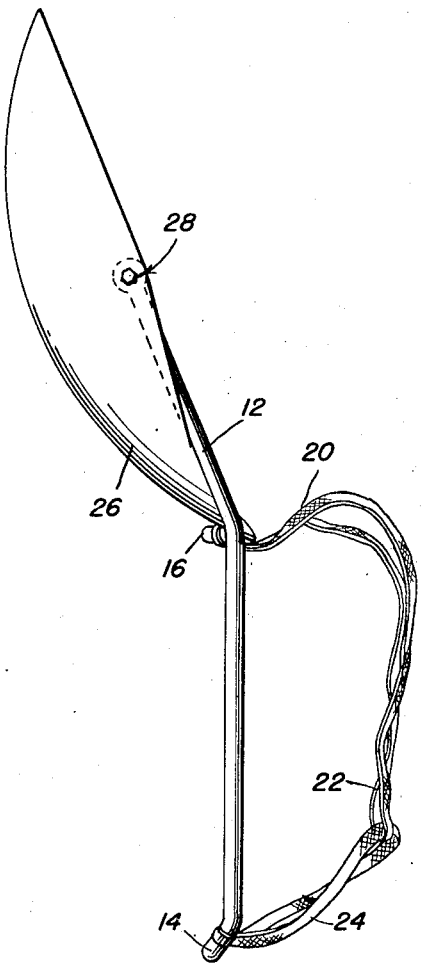
Figure 2 is an elevational side view of the invention shown in Figure 1.
Figure 3:
Figure 3 is a transverse sectional view of the invention shown in Figure 1 and taken substantially on the line 3—3 thereof and in the direction of the arrows.

Going now to the embodiment of the present invention illustrated in Figures 1 to 3 inclusive, there is disclosed a support which is composed of a pair of arms 10 and 12 respectively. These arms are joined at the bottom by a cross member 14 and if desired, this cross member 14 may be formed intergral with the arms 10 and 12. A tie rod 16 extends across the said arms 10 and 12 respectively for a dual purpose.

A harness is provided on the tie rod 16 and cross member 14 for the purpose of engaging the support to a selected portion of the anatomy. Going to Figure 2 it will be noted that members 14 and 16 respectively are slightly curved in order to provide a firm seat for the support on the body of an individual. A first strap 20 is secured at the ends thereof to the tie rod 16 and has a rivet or the like 22 at substantially the center thereof, joining selected portions of the strap thereby forming a loop. A second strap 24 is secured to the cross member 14 and extends through the said loop. A buckle or other conventional fastening means may be interposed in the said second strap 24 for the obvious purpose of attaching and detaching the resulting harness to the body of an individual.

A transparent windshield member 26 is secured to the said support. The upper portions of the arms 10 and 12 respectively are utilized for this purpose. An aperture is provided in each one of said arms 10 and 12 and apertures are likewise provided in selected portions of the said transparent member 26. Bolts, pivots or the like extend through pairs of the said apertures and are generally indicated at 28. The said transparent member may be composed of any suitable material such as Plexiglas, commercial plastic or the like.

Going again to Figure 2 it will be noted that the lower portion of the transparent body member extends between the arms 10 and 12 and the tie rod 16. This construction obviously precludes pivotal movement about the securing means 28 as an axis.

Figures 4, 5:
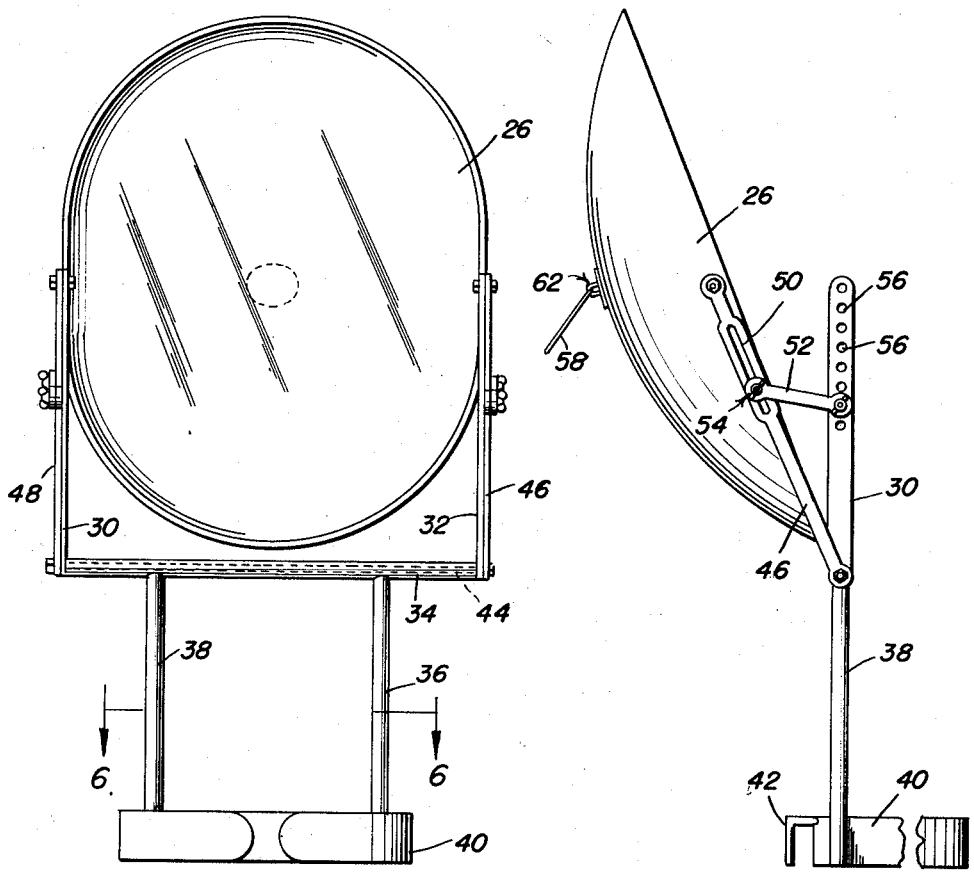
Figure 4 is an elevational view of the second form of the invention.
Figure 5 is an elevational side view of the invention shown in Figure 4.
Figure 6:
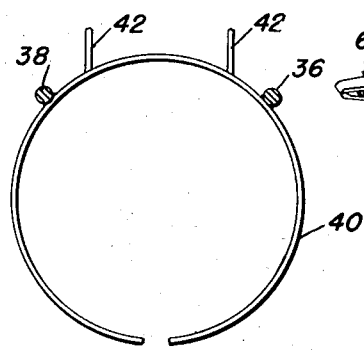
Figure 6 is a transverse sectional view of the invention shown in Figure 4 and taken on the line 6—6 thereof.
Figure 7:
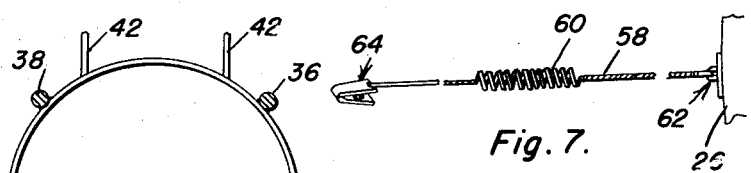
Figure 7 is a fragmentary detailed construction showing the ancillary attachment means used in conjunction with the transparent member.

Going now to Figures 4 through 7 inclusive particular note is made of Figure 5. Here there is disclosed a support having arms 30 and 32 respectively associated therewith. A tie rod or hollow shaft retaining bearings 34 joins the said arms 30 and 32 respectively. Links 36 and 38 respectively extend from the tie rod 34 and terminate in a substantially circular resilient body engaging member 40. The preferable construction of the said body engaging member 40 is substantially circular having an opening at one portion thereof and composed of spring steel or the like. A pair of hooks 42 is secured to the said spring steel body engaging member 40 for the purpose of supporting the invention on a selected element of a vehicle, when the invention is not actually in use.

A shaft extends through the said tie rod 34 and retains links 46 and 48 respectively at the ends thereof. The opposite ends of the said links are rigidly and pivotally secured to the said windshield member 26 which is substantially identical to that windshield member described in the first embodiment of the invention. Slots 50 are provided in the said links 46 and 48 respectively and pitman means is associated therewith. This pitman means may be seen best in Figure 5 wherein there is disclosed a small pitman rod 52 provided with a wing nut and bolt construction 54 for retaining the same in the said slots 50. Obviously, this particular construction is utilized for the purpose of employing an adjustment. The opposite end of the said pitman rod 52 is received in a selected one of a plurality of apertures 56 in each of the said arms 32 and 30 respectively.

In adjusting the said transparent member 26, all that is necessary is to either slide the pitman rod 52 in the associated slot 50 and/or adjust the said pitman rod 52 in a selected aperture 56.

In order to further assist in retaining the transparent member 26 in the selected, desired position a shock cord is used in association therewith. This shock cord may be seen best in Figure 7 wherein there is disclosed a conventional cord means 58 having a spring 60 interposed therein. One end of the said shock cord means is rigidly secured by utility of a conventional eye construction 62, to the transparent member 26, while the other end of the said shock cord means has a conventional clamp of the clip type, secured thereto. Any selected element of a vehicle may be utilized for clipping the end of the shock cord 58 thereto such as a motorcycle headlamp bracket, handle bar or the like. Obviously, the spring in the said shock cord assists in absorbing some of the said shock normally associated with devices of this nature and, the shock cord construction draws forwardly on the transparent member 26 to assist in resisting wind force.

While there has been described and illustrated a preferred embodiment of the present invention, capable of performing all of the specifically mentioned objects as well as other objects, it is apparent that various departures may be made herein without departing from the spirit of the invention. Accordingly, limitation is sought only in accordance with the scope of the following claims.

Having described the invention, what is claimed as new is:

1. A windshield comprising a support, means for detachably securing said support to a person, a transparent member having a convex surface to reduce air resistance of said member when passed through air, said support including a pair of arms having apertures therein, and links pivotally secured to said arms and said member intermediate the upper and lower ends of said member, a slot in each of said links, pitman rods having pins located intermediate the upper and lower ends of said transparent member and adjustably secured in selected ones of said apertures in said arms, and said rods being adjustably secured in said slots, and means including a spring for supporting said member relative to a part of a vehicle.

2. A windshield for a vehicle comprising a transparent panel, a support with means for releasably securing the support to an individual, means securing said panel to said support for adjustment, a shock cord secured at one end to said panel near the center thereof and having means at the other end for releasable attachment to a part of the vehicle, and said shock cord including a spring for enhancing the resiliency of said shock cord.

3. A windshield comprising a support, means at the lower end thereof for detachably securing said support to a person, a transparent panel, means for adjustably securing said panel to the upper end of said support, said adjustable securing means comprising a pair of links pivoted at their lower ends to said support, one link being disposed on one side of said support and the other link being disposed on the other side of said support, means pivoting the upper ends of said links to the sides of said panel, said links having longitudinal slots therein, pitman rods adjustably connected to said links and in said slots, said pitman rods being connected to the upper end of said support, and means including a spring attached to said transparent panel near the pivot axis thereof for releasably supporting said transparent panel with respect to a vehicle.

CHARLES J. BLASIUS.

REFERENCES CITED

The following references are of record in the file of this patent:

UNITED STATES PATENTS

| Number | Name | Date |
| --- | --- | --- |
| 690,351 | Bowen | Dec. 31, 1901 |
| 1,265,764 | Ferrara | May 14, 1918 |
| 1,313,908 | Polasky | Aug. 26, 1919 |
| 2,105,028 | Dickhoff | Jan. 11, 1938 |
| 2,448,734 | Phillips | Sept. 7, 1948 |

FOREIGN PATENTS

| Number | Country | Date |
| --- | --- | --- |
| 608,357 | France | July 26, 1926 |
| 533,714 | Germany | Sept. 19, 1931 |
| 534,263 | Germany | Sept. 24, 1931 |
| 338,305 | Italy | Mar. 31, 1936 |
| 95,151 | Sweden | Mar. 21, 1939 |